United States Patent [19]

Van Gilst

[11] Patent Number: 4,800,844
[45] Date of Patent: Jan. 31, 1989

[54] DISPENSING DEVICE FOR FEED OR WATER

[75] Inventor: Carl W. Van Gilst, Goshen, Ind.

[73] Assignee: Agri-Plastics, Inc., Goshen, Ind.

[21] Appl. No.: 937,819

[22] Filed: Dec. 4, 1986

[51] Int. Cl.4 .......................... A01K 5/00; A01K 7/00
[52] U.S. Cl. .................................. 119/51.5; 119/52 R
[58] Field of Search ........................... 119/51.5, 52 R; 222/185, 457

[56] References Cited

U.S. PATENT DOCUMENTS

| 1,640,583 | 8/1927 | Steinruck | 222/457 |
| 2,701,549 | 2/1955 | Jones | 119/52 R |
| 2,808,029 | 10/1957 | Geerlings | 119/52 R |
| 4,303,039 | 12/1981 | Thibault | 119/52 R |
| 4,646,944 | 3/1987 | Sanderson | 222/185 |

Primary Examiner—Paul J. Hirsch
Attorney, Agent, or Firm—Wendell E. Miller

[57] ABSTRACT

A dispensing device (10) for dispensing food or water for animals or fowl includes a dispensing unit (12) having a reservoir (18) and a neck (20), and a base unit (14) having a pan (24) and a neck-receiving collar (30). When liquid is dispensed, the outlet (38) of the dispensing unit (12) is abutted against the inside bottom surface (26) of the pan (24), and a first effective opening (42) is provided between the outlet (38) and the inside bottom surface (26) of the pan (24) because the outlet (38) is disposed at an angle (40) to the inside bottom surface (26). When the dispensing device (10) is used for dry feed, the outlet (38) of the dispensing unit (12) is positioned with a second, and larger, effective opening (48) between the outlet (38) and the inside bottom surface (26) of the pan (24).

18 Claims, 2 Drawing Sheets

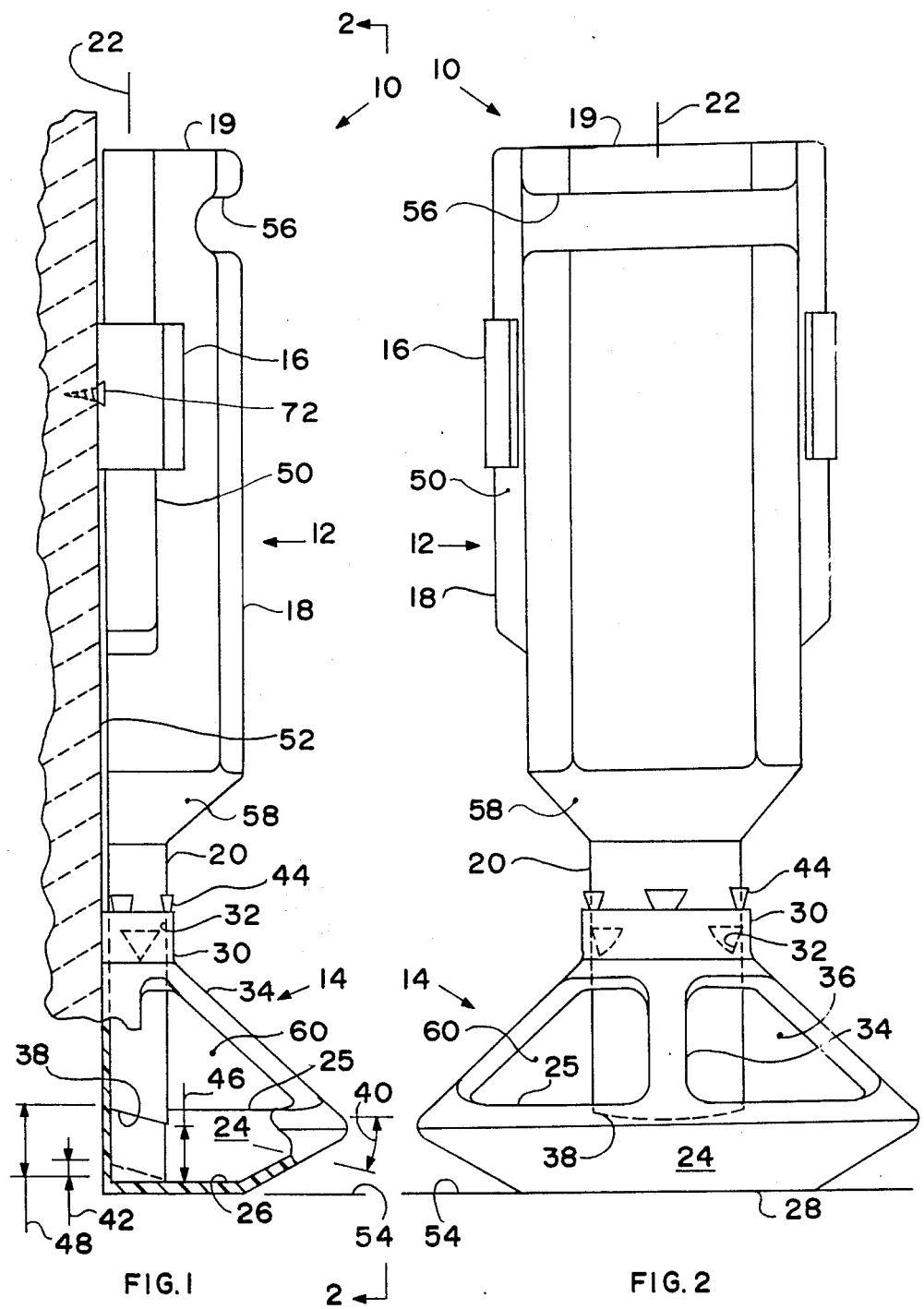

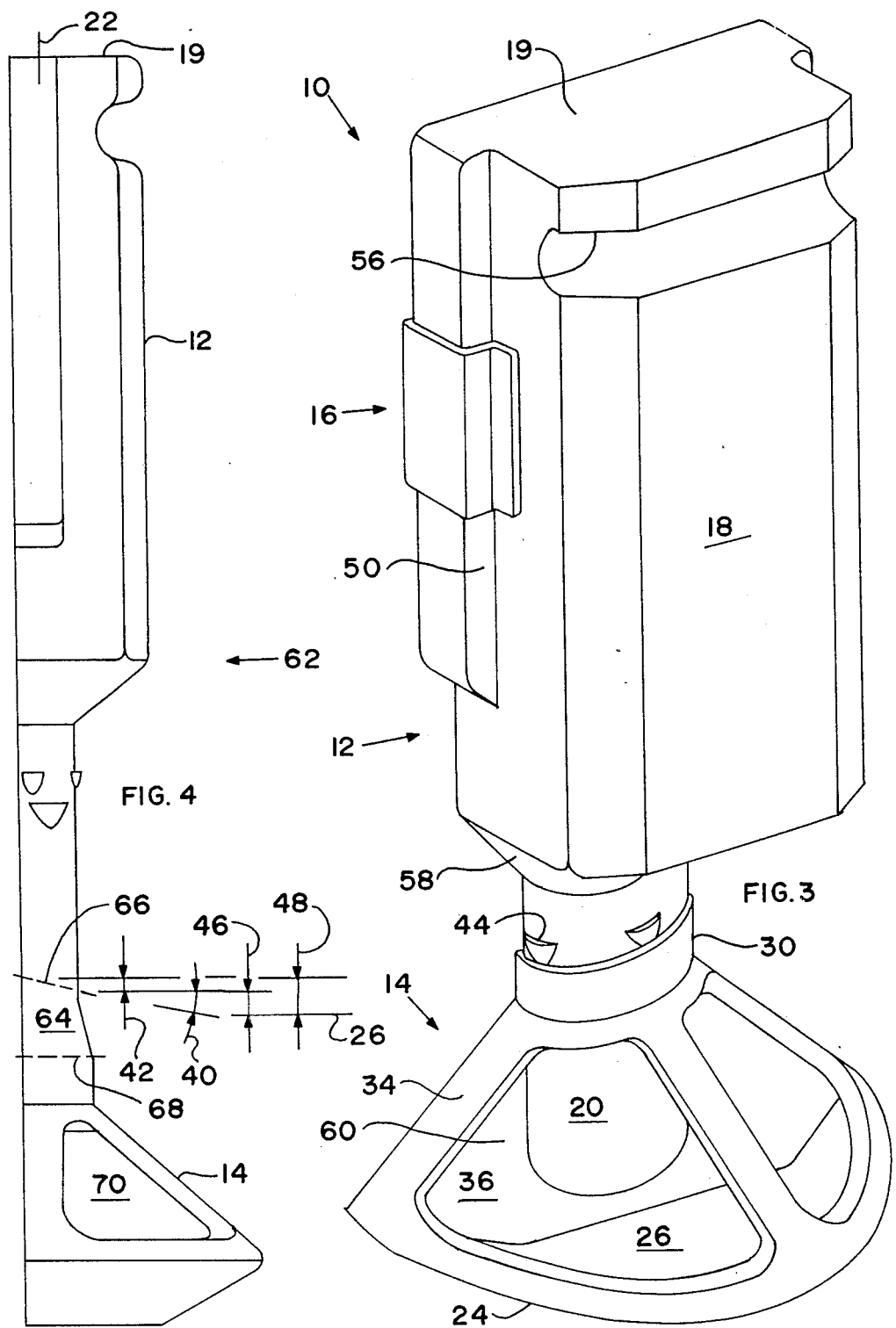

4,800,844

DISPENSING DEVICE FOR FEED OR WATER

BACKGROUND OF THE INVENTION

1. Field of the Invention

The present invention relates to dispensing devices. More particularly the present invention relates to devices for dispensing liquid feed, granulated feed, or water to domesticated animals or fowl.

2. Description of the Prior Art

The prior art includes watering devices in which a fruit jar is used in conjunction with a base that serves as a watering trough. The fruit jar is filled with water, the base is placed on top of the fruit jar in an inverted position, and the fruit jar and base are held together manually while the two are inverted.

The prior art includes milk feeders for pigs in which a reservoir is filled by turning the feeder on one end, removing a cap from the end that is up, filling the reservoir, replacing the cap, and rotating the feeder to the feeding position.

The prior art also includes feeders for dry or granulated materials in which a cap of a reservoir is removed, the feed is poured into the open top of the reservoir, the cap is replaced, and the graunulated feed proceeds downward, outward, and upward into a feed pan.

The first device mentioned above is difficult to turn upright without spilling some of the liquid; so it is not adaptable to feeding milk. Also, it would be overturned by eating animals if such a device were used as a pig feeder.

The other two prior art devices cannot be disassembled; so they are difficult to clean. Also, one is used for water or liquid feed, and the other is used for granulated feed. This necessitates the purchase and use of two different feeders; and it requires that the animals learn to find a different feeding device as they grow from drinking milk to eating dry feed.

SUMMARY OF THE INVENTION

In the present invention, a dispensing device includes a base unit having a neck-receiving collar that is disposed above a pan, and that is attached to the pan by both a back panel and a separator bar; and the dispensing device includes a dispensing unit having a reservoir with an integral neck.

The neck slides into the neck-receiving collar of the base unit, and is selectively positioned with an outlet of the neck at two different positions with respect to a bottom surface of the base unit.

In one position, the dispensing device is used for dispensing liquid feed, for dispensing water, or for dispensing medicated water. In the other position of the neck, the dispensing device is used for dispensing dry or granulated feed.

The dispensing unit and the base unit are molded as an integral unit, by either blow molding or rotational molding; and the dispensing unit and the base unit are severed from a transition portion, or moil, that is molded intermediate of the dispensing unit and the base unit.

It is a first object of the present invention to provide a feeder in which both liquid and granulated materials can be fed.

It is a second object of the present invention to provide a feeder in which the outlet of a neck can be positioned at one distance from an inside bottom surface of the pan for feeding liquid feed or water, and in which the outlet of the neck can be positioned at another distance from the inside bottom surface for feeding dry or granulated feed.

It is another object of the present invention to provide a feeder in which the outlet is beveled, and the neck is abutted against the inside bottom surface of the pan to achieve a first effective opening between the neck and the inside bottom surface.

It is an object of the present invention to provide a feeder in which a second effective opening between the neck and the inside bottom surface is achieved by locating the neck in accordance with a protrusion that extends outwardly from the neck.

It is an object of the present invention to provide a feeder in which assembly, disassembly, relative positioning of parts for dispensing either a liquid or a dry feed, attachment to a supporting surface, and cleaning are all facilitated.

Finally, it is an object of the present invention to provide a feeder in which both the dispensing unit and the base unit are molded as an integral part, severed from a transition portion, or moil, and assembled by the neck of the dispensing unit sliding into a neck-receiving collar of the base unit.

BRIEF DESCRIPTION OF THE DRAWINGS

FIG. 1 is a side elevation of a preferred embodiment of the present invention with a portion of the pan broken out, and showing the neck of the dispensing unit in both positions thereof.

FIG. 2 is a front elevation of the embodiment of FIG. 1, taken substantially as shown by view line 2—2 of FIG. 1;

FIG. 3 is a perspective view of the embodiment of FIGS. 1 and 2; and

FIG. 4 is a side elevation of the dispensing unit and the base unit of the embodiment of FIG. 1-3 molded as an integral part with a transition portion, or moil, interposed therebetween.

DESCRIPTION OF THE PREFERRED EMBODIMENTS

Referring now to the drawings, and more particularly to FIGS. 1-3, a dispensing device 10 includes a dispensing unit 12, a base unit 14, and a bracket 16.

The dispensing unit 12 includes a reservoir 18 and an integral neck 20 that are disposed generally along an axis 22. the reservoir 18 includes an integral top 19.

The base unit 14 includes a pan 24 having a rim 25 which determines the maximum fluid level, having an inside bottom surface 26 and an outside bottom surface 28, a neck-receiving collar 30 having an inside surface 32, and being connected to the pan 24 by three separator bars 34 and a back panel 36.

The neck 20 includes an outlet 38 which is beveled at an angle 40 from the axis 22 which preferably is more than ten degrees from being square with the axis 22, and more than ten degrees from being parallel with the inside bottom surface 26 of the pan 24.

The angle 40 bevels the outlet 38 upward for a distance 42, as shown in FIG. 4.

Because the outlet 38 is beveled upwardly at the angle 40, juxtaposing the outlet 38 against the inside bottom surface 26 serves as a first locator means, or as a means for locating the outlet 38 at a predetermined position with respect to the inside bottom surface 26, and for providing a first effective opening between the outlet 38 and the inside bottom surface 26 that is equal to the distance 42.

The neck 20 includes protrusions 44 that extend outwardly from the neck 20, and that serve as another locator means, or as a means for locating the outlet 38 at a distance 46 above the inside bottom surface 26, as illustrated in FIG. 4, when the relative positions of the neck 20 and the neck-receiving collar 30 are as shown in FIGS. 1-3.

When the neck 20 is positioned above the inside bottom surface 26 by the protrusions 44 at the distance 46, as illustrated in FIG. 4, a second effective opening 48 between the outlet 38 and the inside bottom surface 26 is provided that is equal to the sum of the first distance 42 of the angle 40 and the distance 46.

The dispensing unit 12 includes a pair of spaced-apart guide surfaces 50 which cooperate with the bracket 16 to provide a means for mounting the dispensing device 10 to a supporting structure, or wall, 52 and for permitting the dispensing device 10 to be slidably positioned down against a supporting surface, or floor 54.

The dispensing unit 12 includes a hand-hold recess 56 that is recessed into the reservoir 18; so that the dispensing device 10 is not likely to be dropped even with hands that are slick with milk, or with hands that are gloved.

The dispensing unit 12 includes a funnel portion 58 that provides a smooth transition between the reservoir 18 and the neck 20; so that feed flows easily and predictably from the reservoir 18 to the neck 20; and so that cleaning of the dispensing device 10 is facilitated.

The dispensing device 10 includes a pair of head-receiving openings 60 that are disposed intermediate of the three separator bars 34, the pan 24 and the neck-receiving collar 30, and that each receives the head of one pig, or other animal or fowl.

Referring now to FIG. 4, an integral molding 62 includes the dispening unit 12, the base unit 14, and a transition portion, or moil, 64.

The integral molding 62 is made of a suitable thermoplastic material, such as polyethylene, by blow molding or by rotational molding; and the dispensing unit 12 and the base unit 14 are severed from the transition portion, or moil, 64 after molding, as indicated by dash lines 66 and 68.

The transition portion 64 serves as a means for increasing the inside surface 32 diameter of the neck receiving collar 30 for slidably receiving the neck 20.

The head-receiving openings 60 of FIGS. 1-3 are defined by depressions 70 of FIG. 4; and the depressions 70 are used to define the size and location for cutting the head-receiving openings 60, subsequent to the molding step.

In use, the bracket 16 is attached to the supporting structure 52 by screws 72, the dispensing unit 12 is inverted with the neck 20 disposed upwardly, the reservoir 18 is filled with water, medicated water, milk, other liquid feed, or dry feed, the base unit 14 is attached to the dispensing unit 12 by sliding the neck-receiving collar 30 over the neck 20, the outlet 38 is positioned with respect to the inside bottom surface 26 of the pan 20 to provide an effective opening 48 for dispensing dry feed by feeding when the protrusions 44 engage the neck-receiving collar 30, or by feeling the neck 20 engage the inside bottom surface 26 of the pan 24 to provide an effective opening 42 for dispensing liquids, the dispensing device 10 is inverted to the upright position, as shown, by rotating the back panel 36 under the outlet 38 of the neck 20, the guide surfaces 50 are slidingly inserted into the bracket 16, and the dispensing unit 10 is moved downwardly until the pan 24 is abutted against the supporting surface 54.

That is, both effective openings are selectively and precisely repeatable by the sense of feel. One of the effective openings 48 is determined by feeling the protrusions 44 engaging the neck-receiving collar 30, and the other effective opening 42 is determined by feeling the neck 20 engage the inside bottom surface 26 of the pan 24.

As can be seen in FIG. 1, both the outlet 38 and the first effective opening 42 are below the maximum fluid level of the pan 24 as determined by the rim 25, when the outlet 38 is abutted against the inside bottom surface for dispensing liquid materials.

As can be seen in FIG. 1, the integral top 19 prevents air from entering the reservoir 18 from a location that is above the maximum fluid level of the pan 24 as determined by the rim 25, or from entering the reservoir 18 by any other means except through the outlet 38.

While the description describes a device for dispensing feed or water to domestic animals or fowl, it should be understood that "animals" as recited in the claims includes both animal and fowl.

While specific apparatus has been disclosed in the preceding description, and while numbers have been inserted into the claims that reference particular details of the drawings, it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention is applicable to feeding both liquid and dry feed to domesticated animals and fowl that are keep for commercial uses or for pets, for feeding wild animals and fowl, for watering animals or fowl, and for dispensing medications to animals or fowl.

What is claimed is:

1. A dispensing device (10) for both liquid and dry materials, which dispensing device comprises:
   a base unit (14) having a pan (24) with an inside bottom surface (26);
   means 25, being disposed above said inside bottom surface, for determining the maximum fluid level of said pan;
   a dispensing unit (12) having a reservoir 18, and having an outlet (38) that communicates with said reservoir;
   means (16) for operatively attaching said dispensing unit to said base unit with said outlet opening into said pan;
   means (32, 40) for selectively providing a first effective opening (42) between said outlet and said inside bottom surface that is located entirely below said maximum fluid level for dispensing liquid materials into said pan;
   means (32, 46) for selectively providing a second and larger effective opening (48) between said outlet and said inside bottom surface for dispensing dry materials into said pan; and
   means (19) for preventing air from entering said dispensing unit except through said outlet.

2. A dispensing device (10) as claimed in claim 1 in which said reservoir (18) includes an integral neck (20) having said outlet (38);

said base unit (14) comprises a neck-receiving collar (30);

said means for operatively attaching said dispensing unit to said base unit comprises said neck being slidably inserted into said neck-receiving collar; and said means for selectively providing said effective openings comprises selectively positioning said neck in said neck-receiving collar.

3. A dispensing device (10) as claimed in claim 2 in which said outlet (38) of said neck (20) is disposed at an angle (40) to said inside bottom surface (26); and said providing of said first effective opening (42) comprises abutting said neck against said inside bottom surface and said angle (40) of said outlet.

4. A dispensing device (10) as claimed in claim 2 in which said neck (20) comprises locator means, comprising a protrusion (44) that extends outwardly from said neck, for repeatedly and precisely positioning said neck to one of said selective positions.

5. A dispensing device (10) as claimed in claim 1 in which said outlet (38) is disposed at an angle (40) to said inside bottom surface (26); and said providing of said first effective opening (42) comprises abutting said dispensing unit (12) against said inside bottom surface and said angle of said outlet.

6. A dispensing device (10) as claimed in claim 2 in which said reservoir (18) includes an integral top (19) and is fillable only through said outlet (38); and said base unit (14) includes means, comprising a back panel (36), for catching material discharged from said outlet (38) when said dispensing device is rotated into an upright position subsequent to inversion, filling, and assembly of said base unit to said dispensing unit (12).

7. A dispensing device (10) as claimed in claim 2 in which said reservoir (18) and neck (20) are disposed generally parallel to an axis (22);

said reservoir includes spaced-apart guide surfaces (50) that are disposed parallel to said axis; and said dispensing device includes bracket means (16), for attachment to a supporting structure (52), for slidably receiving said guide surfaces, and for permitting said pan (24) of said base unit (14) to be positioned against a supporting surface (54).

8. A dispensing device (10) for selectively dispensing liquid or dry material to animals, which device comprises:

a base unit (14) having a pan (24) with an inside bottom surface (26), and with a rim (25) that extends upwardly from said inside bottom surface;

a dispensing unit (12) having a reservoir (18) that includes an integral top (19), and having a neck (20) that is integral with said reservoir and that includes an outlet (38);

means, comprising a neck-receiving collar (30) that is operatively connected to said pan, for slidably receiving said neck, and for attaching said dispensing unit to said base unit while both said dispensing unit and said base unit are in inverted positions;

means (40) for providing a first effective opening (42) from said outlet that is located entirely below said rim to dispense liquid materials; and means, comprising positioning said neck with respect to said neck-receiving collar, for providing a second and larger effective opening (48) from said outlet to dispense dry materials.

9. A dispensing device (10) as claimed in claim 8 in which said outlet (38) of said neck (20) is disposed at an angle (40) to said inside bottom surface (26); and said means for providing one of said effective openings (42) comprises disposing said outlet at said angle (40) to said inside bottom surface, and abutting said neck against said inside bottom surface.

10. A dispensing device (10) as claimed in claim 8 in which said means for providing one of said effective openings (42) comprises abutting said neck (20) against said inside bottom surface (26).

11. A dispensing device (10) as claimed in claim 8 in which said dispensing unit (12) is fillable only through said outlet (38); and said base unit (14) includes means, comprising a back panel (36), for catching material discharged from said outlet (38) of said neck (20) when said dispensing device is rotated into an upright position subsequent to inversion of said dispensing unit (12), filling said dispensing unit, and assembling said base unit to said dispensing unit.

12. A dispensing device (10) as claimed in claim 8 in which said reservoir (18) and neck (20) are disposed along an axis (22);

said reservoir includes spaced-apart guide surfaces (50) that are disposed parallel to said axis; and said dispensing device includes bracket means (16), for attachment to a supporting structure (52), for slidably receiving said guide surfaces, and for permitting said pan (24) of said base unit (14) to be abutted against a supporting surface (54).

13. A dispensing device (10) for supplying liquid or dry materials to animals, which device comprises:

a base unit (14) having a pan (24) with an inside bottom surface (26);

means (25) for determining the maximum fluid level in said pan;

a dispensing unit (12) having an outlet (38);

means (20, 30) for operatively attaching said dispensing unit to said pan prior to inverting said dispensing unit to an upright position subsequent to filling said dispensing unit;

means for providing a first effective opening (42) between said outlet and said inside bottom surface that is located entirely below said maximum fluid level to dispense liquid materials;

means for providing a second and larger effective opening (48) between said outlet and said inside bottom surface to dispense dry materials; and means (19) for preventing air from entering said dispensing unit from a location that is above said maximum fluid level.

14. A dispensing device (10) as claimed in claim 13 in which said dispensing unit (12) comprises means (40) for providing said first effective opening (42) when said outlet (38) is abutted against said inside bottom surface (26).

15. A dispensing device (10) as claimed in claim 14 in which said outlet (38) is disposed at an angle (40) to said inside bottom surface (26); and said means for providing said first effective opening (42) comprises said angle.

16. A dispensing device (10) as claimed in claim 13 in which said base unit (14) comprises a neck-receiving collar (30) that is operatively attached to said pan (24);

said dispensing unit (12) comprises a neck (20) having said outlet (38);

said means for operatively attaching said dispensing unit comprises said neck being slidably inserted into said neck-receiving collar; and said means for providing said second and larger effective opening (48) comprises positioning said neck in said neck-receiving collar.

17. A dispensing device (10) as claimed in claim 16 in which said providing of said second and larger effective opening (48) includes means (44) for feeling when said neck (20) is positioned in said neck-receiving collar (30) to provide said second effective opening (48).

18. A dispensing device (10) as claimed in claim 13 in which said base unit (14) comprises a neck-receiving collar (30) that is operatively attached to said pan (24);

said neck (20) is slidably inserted into said neck-receiving collar and is positionable with respect to said inside bottom surface of said pan;

said means for operatively attaching said dispensing unit (12) to said base unit (14) comprises said neck and said neck-receiving collar;

said means for providing said second and larger effective opening (48) comprises positioning said outlet (38) with respect to said inside bottom surface (26) of said pan (24); and said dispensing device includes means (40, 44) for precisely and repeatedly positioning said neck in said neck-receiving collar to either of the positions wherein one of said effective openings is provided.

* * * * *